US007263485B2

(12) United States Patent
Wark

(10) Patent No.: US 7,263,485 B2
(45) Date of Patent: Aug. 28, 2007

(54) ROBUST DETECTION AND CLASSIFICATION OF OBJECTS IN AUDIO USING LIMITED TRAINING DATA

(75) Inventor: Timothy John Wark, Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 868 days.

(21) Appl. No.: 10/446,099

(22) Filed: May 28, 2003

(65) Prior Publication Data

US 2003/0231775 A1 Dec. 18, 2003

(30) Foreign Application Priority Data

May 31, 2002 (AU) .................................. PS2709

(51) Int. Cl.
*G10L 15/14* (2006.01)
(52) U.S. Cl. .................................. 704/240; 704/256.7
(58) Field of Classification Search ...................... None
See application file for complete search history.

(56) References Cited

U.S. PATENT DOCUMENTS

| | | | | |
|---|---|---|---|---|
| 5,748,196 A | * | 5/1998 | Coelho et al. | 715/716 |
| 5,918,223 A | | 6/1999 | Blum et al. | 707/1 |
| 6,006,186 A | * | 12/1999 | Chen et al. | 704/254 |
| 6,055,495 A | | 4/2000 | Tucker et al. | 704/210 |
| 6,317,710 B1 | | 11/2001 | Huang et al. | 704/246 |
| 6,405,166 B1 | | 6/2002 | Huang et al. | 704/246 |
| 6,542,869 B1 | | 4/2003 | Foote | 704/500 |

OTHER PUBLICATIONS

Zhang, T., et al., "Content-based Classification and Retrieval of Audio", *SPIE Conf. On Advanced Signal Processing, Algorithms, Architectures & Implementations* (1998).
Wang, Y., et al., "Multimedia Content Analysis", *IEEE Signal Processing Magazine*, pp. 12 to 36 (2000).
Liu, Z., et al., "Audio Feature Extraction and Analysis For Scene Segmentation And Classification", *Journal of VLSI Signal Processing*, pp. 61 to 70 (1998).
Gerard, D., "Audio Signal Classification: An Overview", *Canadian Artificial Intelligence* (2000).

* cited by examiner

*Primary Examiner*—Abul K. Azad
(74) *Attorney, Agent, or Firm*—Fitzpatrick, Cella, Harper & Scinto

(57) ABSTRACT

A method (200) and apparatus (100) for classifying a homogeneous audio segment are disclosed. The homogeneous audio comprises a sequence of audio samples (x(n)). The method (200) starts by forming a sequence of frames (701-704) along the sequence of audio samples (x(n)), each frame (701-704) comprising a plurality of the audio samples (x(n)). The homogeneous audio segment is next divided (206) into a plurality of audio clips (711-714), with each audio clip being associated with a plurality of the frames (701-704). The method (200) then extracts (208) at least one frame feature for each clip (711-714). A clip feature vector (f) is next extracted from frame features of frames associated with the audio clip (711-714). Finally the segment is classified based on a continuous function during the distribution of the clip feature vectors (f).

16 Claims, 14 Drawing Sheets

ROBUST DETECTION AND CLASSIFICATION OF OBJECTS IN AUDIO USING LIMITED TRAINING DATA

TECHNICAL FIELD OF THE INVENTION

The present invention relates generally to audio signal processing and, in particular, to the classification of semantic events in audio streams.

BACKGROUND ART

There is an increasing demand for automated computer systems that extract meaningful information from large amounts of data. One such application is the extraction of information from continuous streams of audio. Such continuous audio streams may include speech from, for example, a news broadcast or a telephone conversation, or non-speech, such as music or background noise.

Hitherto a number of systems have been developed for automatically determining the identity of some "event", or "object", that occurs in audio. Such systems range from systems that attempt to identify a speaker from a short section of speech, identify a type of music given a short sample, or search for a particular audio occurrence, such as a type of noise, in a long section of audio. All these systems are based upon the idea of training an event or object model based on features from a set of samples with known identity, and then comparing test samples to a number of object models.

Many of the prior classification systems are based on the use of short-term or frame features in order to characterise objects. Each short-term feature is generally obtained from a small window of signal, typically between 10 ms and 40 ms in length. Common short-term features are features such as energy, mel-cepstrum, pitch, linear-predictive coefficients, zero-crossing rate, etc. Whilst the use of these features is effective in scenarios where there is little mismatch or variation between training and testing conditions, they are far less effective when large variations occur. The prime reason for this is that very little semantic information is captured by such short-term features because just the immediate characteristics of the observed signal are captured. Thus when the signal varies, e.g. through a channel change or environment change, whilst the overall semantic difference might be negligible, the differences in the immediate characteristics of the signal are enough to make the classification system ineffective.

Some more recent classification systems have considered the use of long-term features in order to characterise objects. Long term features are derived from a set of short-term features and alleviate many of the problems with short-term features by capturing much of the higher-level, semantic information. Examples of long-term features are measures such as the standard deviation of short-term features, such as energy or pitch over a segment, the average bandwidth over a segment, measures of the volume characteristics over a segment, etc. Typically a long-term feature will be derived from a section of speech at least 0.5 seconds long, and could be as long as 10 seconds or more.

The previous systems based on the use of long-term features attempt to classify a single, long-term feature vector extracted from a segment. Some of these systems apply a prior segmentation stage to determine segments, whilst others simply slide a long window over the signal and extract a long-term feature over each window segment. These systems have the advantage of extracting and classifying based on higher-level semantic information. However as only a single feature is being used to make a classification decision, such systems often perform poorly in some scenarios.

SUMMARY OF THE INVENTION

It is an object of the present invention to substantially overcome, or at least ameliorate, one or more disadvantages of existing arrangements.

According to an aspect of the invention, there is provided a method of classifying a homogeneous audio segment comprising a sequence of audio samples, said method comprising the steps of:

forming a sequence of frames along said sequence of audio samples, each said frame comprising a plurality of said audio samples;

dividing said segment into a plurality of audio clips, each audio clip being associated with a plurality of said frames;

extracting for each frame at least one frame feature;

extracting for each audio clip a clip feature vector from frame features of frames associated with said audio clip; and classifying said segment based on a continuous function defining the distribution of said clip feature vectors.

According to another aspect of the invention, there is provided a method of extracting feature vectors from an audio segment comprising a sequence of audio samples, said method comprising the steps of:

forming a sequence of frames along said sequence of audio samples, each said frame comprising a plurality of said audio samples;

dividing said segment into a plurality of audio clips, each audio clip being associated with a plurality of said frames;

extracting for each frame at least one frame feature; and extracting said feature vectors by extracting for each audio clip a clip feature vector from frame features of frames associated with said clip.

Other aspects of the invention are also disclosed.

BRIEF DESCRIPTION OF THE DRAWINGS

One or more embodiments of the present invention will now be described with reference to the drawings, in which.

DETAILED DESCRIPTION

Figure 1:
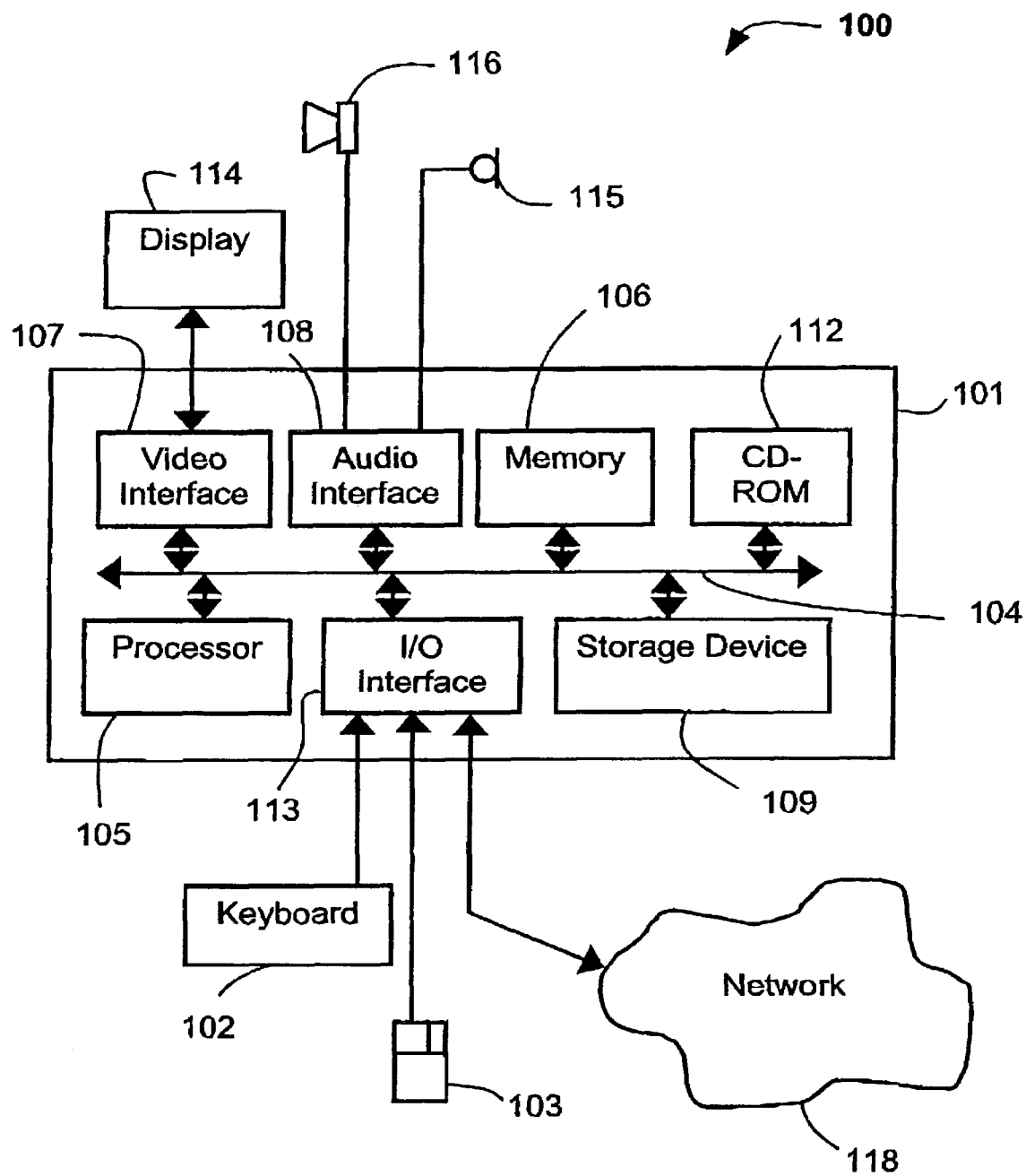
FIG. 1 shows a schematic block diagram of a system upon which audio classification can be practiced.

Some portions of the description which follow are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It should be borne in mind, however, that the above and similar terms are to be associated with the appropriate physical quantities and are merely convenient labels. Unless specifically stated otherwise, and as apparent from the following, it will be appreciated that throughout the present specification, discussions refer to the action and processes of a computer system, or similar electronic device, that manipulates and transform data represented as physical (electronic) quantities within the registers and memories of the computer system into other data similarly represented as physical quantities within the computer system memories or registers or other such information storage, transmission or display devices.

Where reference is made in any one or more of the accompanying drawings to steps and/or features, which have the same reference numerals, those steps and/or features have for the purposes of this description the same function(s) or operation(s), unless the contrary intention appears.

Apparatus

FIG. 1 shows a schematic block diagram of a system 100 upon which audio classification can be practiced. The system 100 comprises a computer module 101, such as a conventional general-purpose computer module, input devices including a keyboard 102, pointing device 103 and a microphone 115, and output devices including a display device 114 and one or more loudspeakers 116.

The computer module 101 typically includes at least one processor unit 105, a memory unit 106, for example formed from semiconductor random access memory (RAM) and read only memory (ROM), input/output (I/O) interfaces including a video interface 104 for the video display 114, an I/O interface 113 for the keyboard 102, the pointing device 103 and interfacing the computer module 101 with a network 118, such as the Internet, and an audio interface 108 for the microphone 115 and the loudspeakers 116. A storage device 109 is provided and typically includes a hard disk drive and a floppy disk drive. A CD-ROM or DVD drive 112 is typically provided as a non-volatile source of data. The components 105 to 113 of the computer module 101, typically communicate via an interconnected bus 104 and in a manner which results in a conventional mode of operation of the computer module 101 known to those in the relevant art.

Audio data for processing by the system 100, and in particular the processor 105, may be derived from a compact disk or video disk inserted into the CD-ROM or DVD drive 112 and may be received by the processor 105 as a data stream encoded in a particular format. Audio data may alternatively be derived from downloading audio data from the network 118. Yet another source of audio data may be recording audio using the microphone 115. In such a case, the audio interface 108 samples an analog signal received from the microphone 115 and provides the resulting audio data to the processor 105 in a particular format for processing and/or storage on the storage device 109.

The audio data may also be provided to the audio interface 108 for conversion into an analog signal suitable for output to the loudspeakers 116.

Method of classifying events in an audio stream

Figure 2:
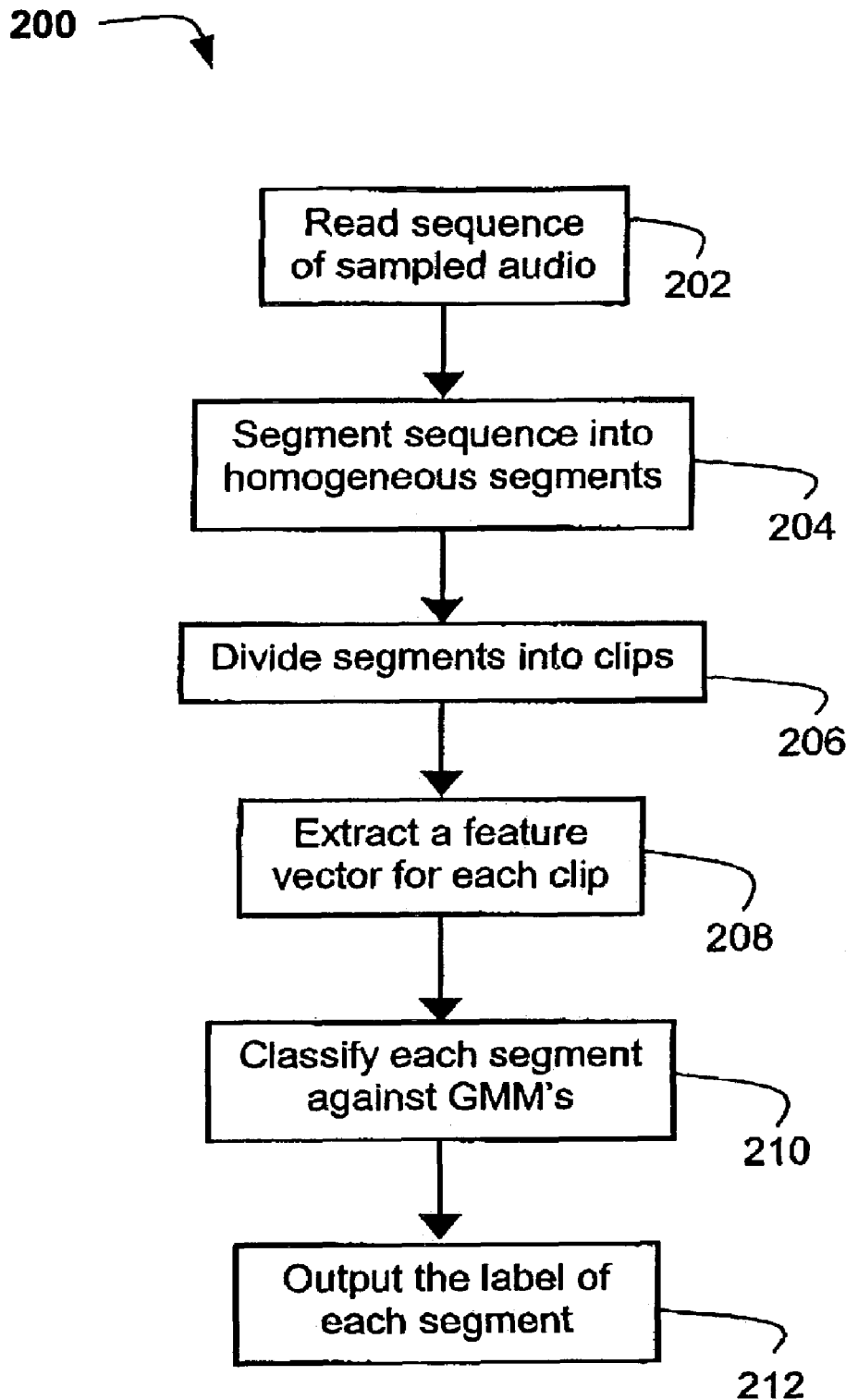
FIG. 2 shows a flow diagram of a method of segmenting an audio stream into homogeneous segments, and then classifying each of those homogeneous segments.

FIG. 2 shows a flow diagram of a method 200 of segmenting an audio stream in the form of a sequence x(n) of samples audio from unknown origin into homogeneous segments, and then classifying each of those homogeneous segments to assign to each an object label. The method 200 is preferably implemented in the system 100 by a software program executed by the processor 105 (FIG. 1).

A homogeneous segment is a segment only containing samples from a source having constant acoustic characteristics, such as from a particular human speaker, a type of background noise, or a type of music. It is assumed that the audio stream is appropriately digitised at a sampling rate F. Those skilled in the art would understand the steps required to convert an analog audio stream into the sequence x(n) of sampled audio. In an example arrangement, the audio stream is sampled at a sampling rate F of 16 kHz and the sequence x(n) of sampled audio is stored on the storage device 109 in a form such as a .wav file or a .raw file. The method 200 starts in step 202 where the sequence x(n) of sampled audio are read from the storage device 109 and placed in memory 106.

The method 200 continues to step 204 where the sequence x(n) of sampled audio is segmented into a number of homogeneous segments. In other words, step 204 located the boundaries in time where the characteristics of the audio signal, contained in the sequence x(n) of sampled audio, significantly change. For example, this could constitute such changes as a transition from speech to music, or a transition from silence to noise.

The preferred segmentation utilizes the Bayesian Information Criterion (BIC) for segmenting the sequence x(n) of sampled audio into a number of homogeneous segments. In order for the BIC to be applied to the sequence x(n) of sampled audio, one or more features must be extracted for each small, incremental interval of K samples along the sequence x(n). An underlying assumption is that the properties of the audio signal change relatively slowly in time, and that each extracted feature provides a succinct description of important characteristics of the audio signal in the associated interval. Ideally, such features extract enough information from the underlying audio signal so that the subsequent segmentation algorithm can perform well, and yet be compact enough that segmentation can be performed very quickly.

Figure 3:
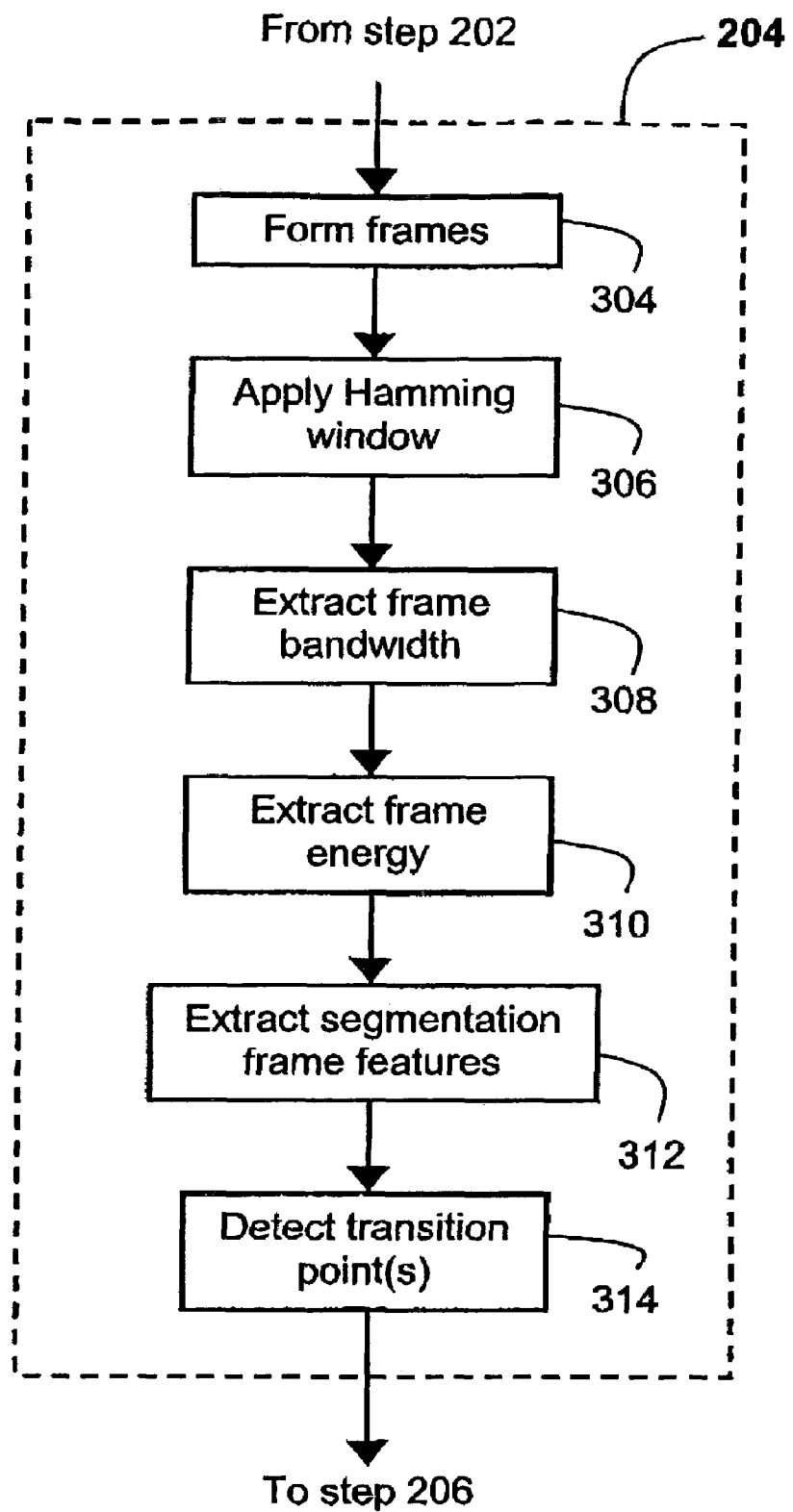
FIG. 3 shows a flow diagram of the preferred sub-steps of segmenting the audio stream into homogeneous segments.

FIG. 3 shows a flow diagram of the preferred sub-steps of step 204 for segmenting the sequence x(n) of sampled audio. Step 204 starts in sub-step 304 where the processor 105 forms interval windows or frames, each containing K audio samples. In the example, a frame of 20 ms is used, which corresponds to K=320 samples at the sampling rate F of 16 kHz. Further, the frames are overlapping, with the start position of the next frame positioned only 10 ms later in time, or 160 samples later, providing a shift-time of 10 ms.

Figure 4:
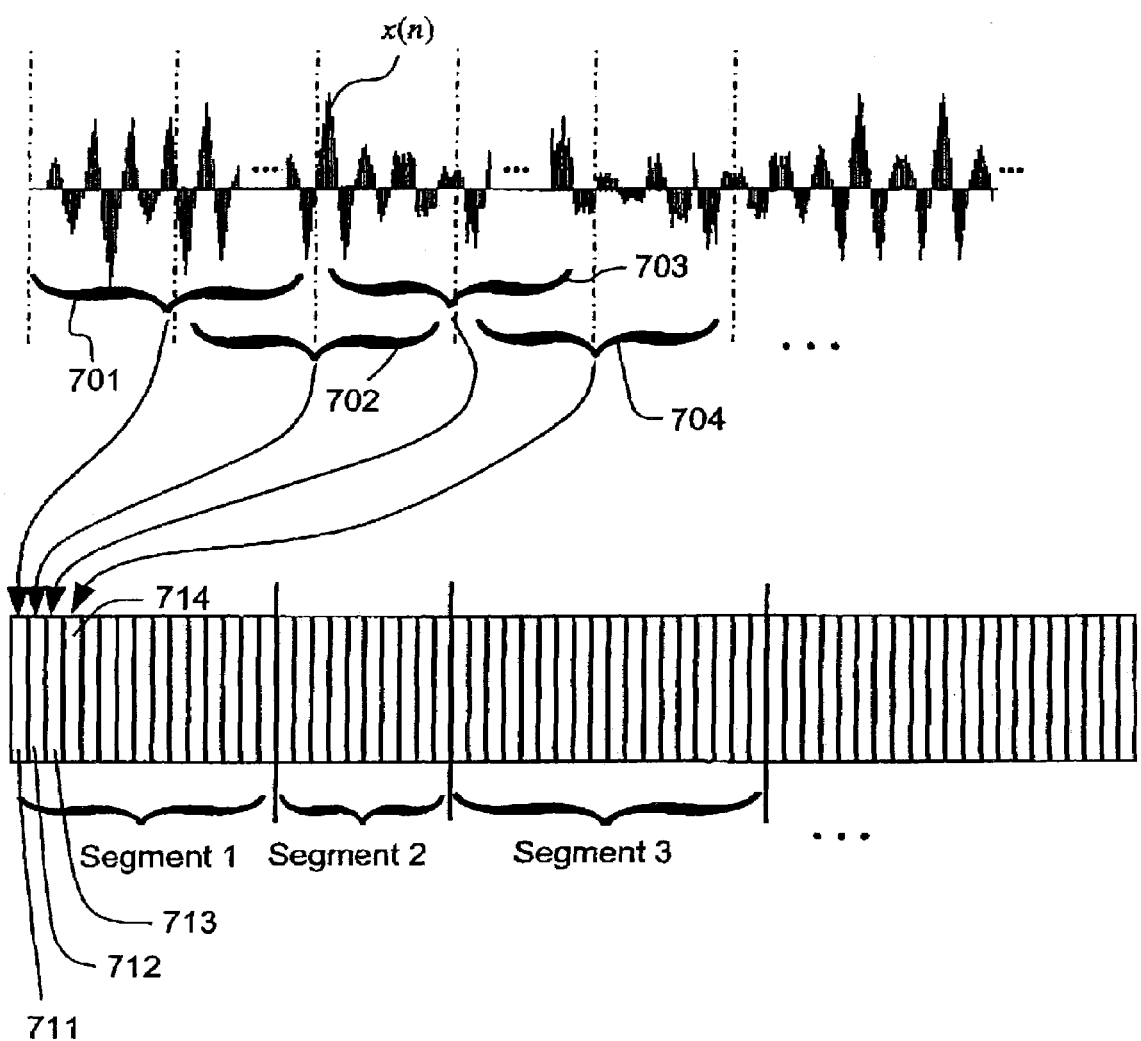
FIG. 4 illustrates a sequence of sampled audio, the division of the sequence into frames, and the segmentation of the frames.

FIG. 4 illustrates a sequence x(n) of sampled audio. Frames 701 to 704 are also illustrated.

Referring again to FIG. 3, in sub-step 306 a Hamming window function of the same length as that of the frames, i.e. K sample long, is applied by the processor 105 to the sequence samples x(n) in each frame to give a modified set of windowed audio samples s(i,k) for frame i, with k∈1, ... K. The purpose of applying the Hamming window is to reduce the side-lobes created when applying the Fast Fourier Transform (FFT) in subsequent operations.

In sub-step 308 the bandwidth bw(i) of the modified set of windowed audio samples s(i,k) of the i'th frame is calculated by the processor 105 as follows:

$$bw(i) = \sqrt{\frac{\int_0^\infty (\omega - FC(i))^2 |S_i(\omega)|^2 \, d\omega}{\int_0^\infty |S_i(\omega)|^2 \, d\omega}} \quad (1)$$

where $|S_i(\omega)|^2$ is the power spectrum of the modified windowed audio samples s(i,k) of the i'th frame, $\omega$ is a signal frequency variable for the purposes of calculation, and FC is the frequency centroid, defined as:

$$FC(i) = \frac{\int_0^\infty \omega |S_i(\omega)|^2 \, d\omega}{\int_0^\infty |S_i(\omega)|^2 \, d\omega} \quad (2)$$

The Simpson's integration is used to evaluate the integrals. The Fast Fourier Transform is used to calculate the power spectrum $|S_1(\omega)|^2$ whereby the samples s(i,k), having length K, are zero padded until the next highest power of 2 is reached. Thus, in the example where the length of the samples s(i,k) is 320, the FFT would be applied to a vector of length 512, formed from 320 modified windowed audio samples s(i,k) and 192 zero components.

In sub-steps 310 the energy E(i) of the modified set of windowed audio samples s(i,k) of the i'th frame is calculated by the processor 105 as follows:

$$E(i) = \sqrt{\frac{1}{K} \sum_{k=1}^{K} s^2(i,k)} \quad (3)$$

A segmentation frame feature $f_s(i)$ for each frame i is calculated by the processor 105 in sub-step 312 by weighting the frame bandwidth bw(i) by the frame energy E(i). This forces a bias in the measurement of bandwidth bw(i) in those frames i that exhibit a higher energy E(i), and are thus more likely to come from an event of interest, rather than just background noise. The segmentation frame features $f_s(i)$ are thus calculated as being:

$$f_s(i) = E(i)bw(i) \quad (4)$$

The BIC is used in sub-step 314 by the processor 105 to segment the sequence of segmentation frame features $f_s(i)$ into homogeneous segments, such as the segments illustrated in FIG. 4. The output of sub-step 314 is one or more frame numbers of the frames where changes in acoustic characteristic were detected transition-points.

The value obtained from the BIC is statistical measure for how well a model represents a set of segmentation frame features $f_s(i)$, and is calculated as:

$$BIC = \log(L) - \frac{D}{2}\log(N) \quad (5)$$

where L is the maximum-likelihood probability for a chosen model to represent the set of segmentation frame features $f_s(i)$, D is the dimension of the model which is 1 when the segmentation frame features $f_s(i)$ of Equation (4) is used, and N is the number of segmentation frame features $f_s(i)$ being tested against the model.

The maximum-likelihood L is calculated by finding parameters $\theta$ of the model that maximise the probability of the segmentation frame features $f_s(i)$ being from that model. Thus, for a set of parameter $\theta$, the maximum-likelihood L is:

$$L = \max_\theta P(f_s(i) | \theta) \quad (6)$$

Segmentation using the BIC operates by testing whether the sequence of segmentation frame features $f_s(i)$ are better described by a single-distribution event model, or a twin-distribution event model, where the first m number of frames, those being frames [1, ... , m], are from a first source and the remainder of the N frames, those being frames [m+1, ... , N], are from a second source. The frame m is accordingly termed the transition-point. To allow a comparison, a criterion difference $\Delta BIC$ is calculated between the BIC using the twin-distribution event model with that using the single-distribution event-model. As the change-point m approaches a transition in acoustic characteristics, the criterion difference $\Delta BIC$ typically increases, reaching a maximum at the transition, and reducing again towards the end of the N frames under consideration. If the maximum criterion difference $\Delta BIC$ is above a predefined threshold, then the two-distribution event model is deemed a more suitable choice, indicating a significant transition in acoustic characteristics at the transition-point m where the criterion difference $\Delta BIC$ reached a maximum.

Current BIC segmentation systems assumes that D-dimensional segmentation frame features $f_s(i)$ are best represented by a Gaussian event model having a probability density function of the form:

$$g\left(f_s(i), \mu, \sum\right) = \frac{1}{(2\pi)^{\frac{D}{2}} |\Sigma|^{\frac{1}{2}}} \exp\left\{-\frac{1}{2}(f_s(i) - \mu)^T \sum\nolimits^{-1} (f_s(i) - \mu)\right\} \quad (7)$$

where $\mu$ is the mean vector of the segmentation frame features $f_s(i)$, and $\Sigma$ is the covariance matrix. The segmentation frame feature $f_s(i)$ of the preferred implementation is one-dimensional and as calculated in Equation (4).

Figure 5A:
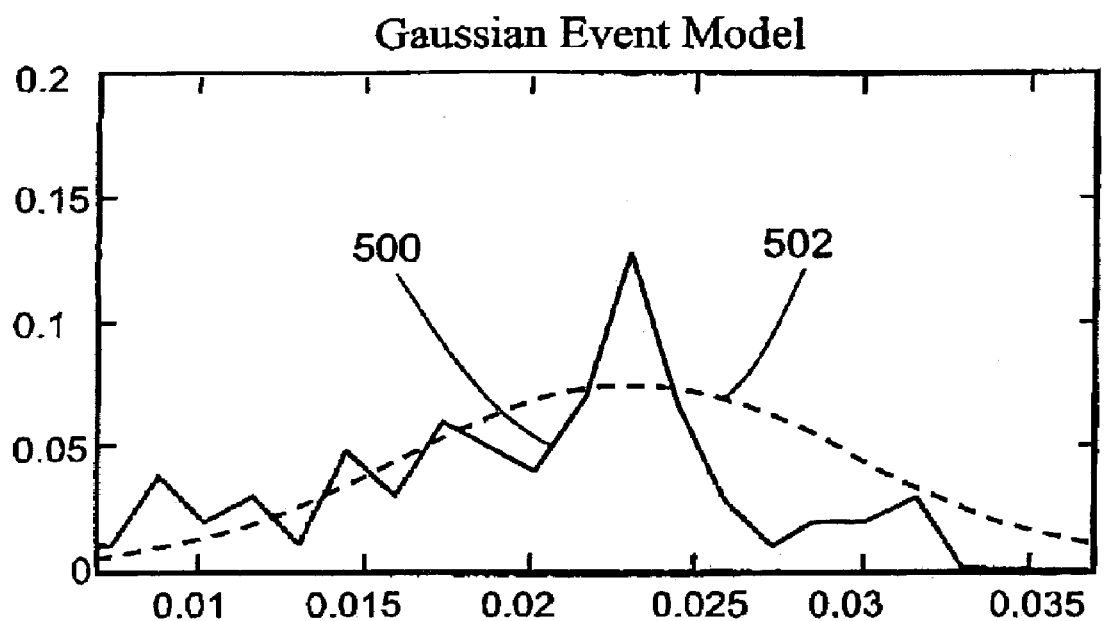
FIG. 5A illustrates a distribution of example frame features and the distribution of a Gaussian event model that best fits the set of frame features obtained from a segment of speech.

FIG. 5A illustrates a distribution 500 of segmentation frame features $f_s(i)$, where the segmentation frame features $f_s(i)$ were obtained from an audio stream of duration 1 second containing voice. Also illustrated is the distribution of a Gaussian event model 502 that best fits the set of segmentation frame features $f_s(i)$.

Figure 5B:
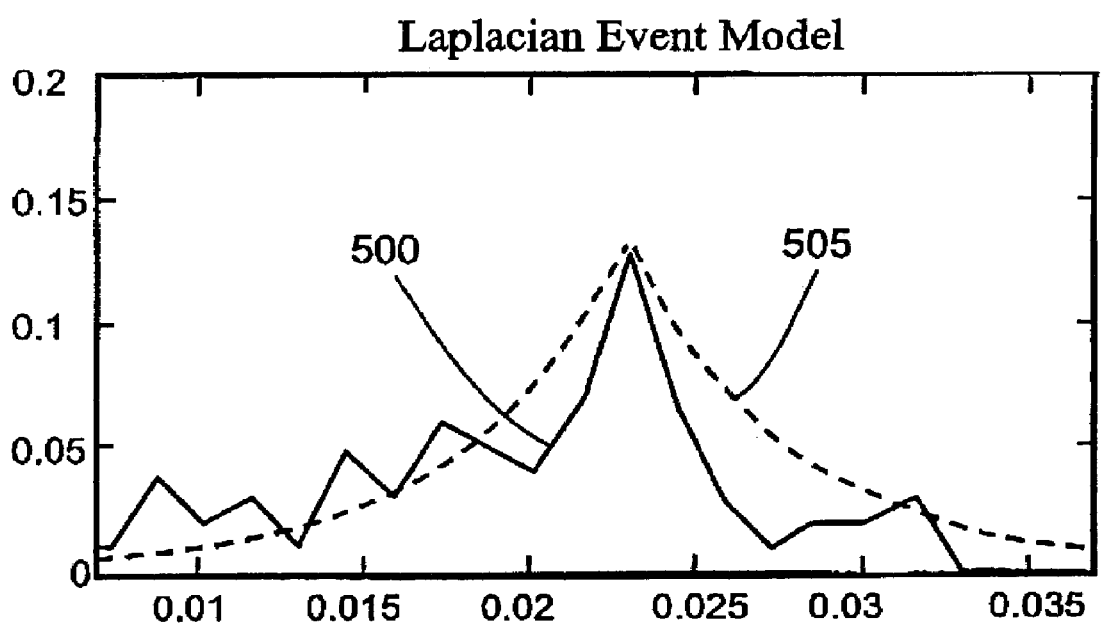
FIG. 5B illustrates a distribution of the example frame features of FIG. 5A and the distribution of a Laplacian event model that best fits the set of frame features.

It is proposed that segmentation frame features $f_s(i)$ representing the characteristics of audio signals such as a particular speaker or a block of music, is better represented by a leptokurtic distribution, particularly where the number N of features being tested against the model is small. A leptokurtic distribution is a distribution that is more peaky than a Gaussian distribution, such as a Laplacian distribution. FIG. 5B illustrates the distribution 500 of the same segmentation frame features $f_s(i)$ as those of FIG. 5A, together with the distribution of a Laplacian event model 505 that best fits the set of segmentation frame features $f_s(i)$. It can be seen that the Laplacian event model gives a much better characterisation of the feature distribution 500 than the Gaussian event model.

Figure 6A:
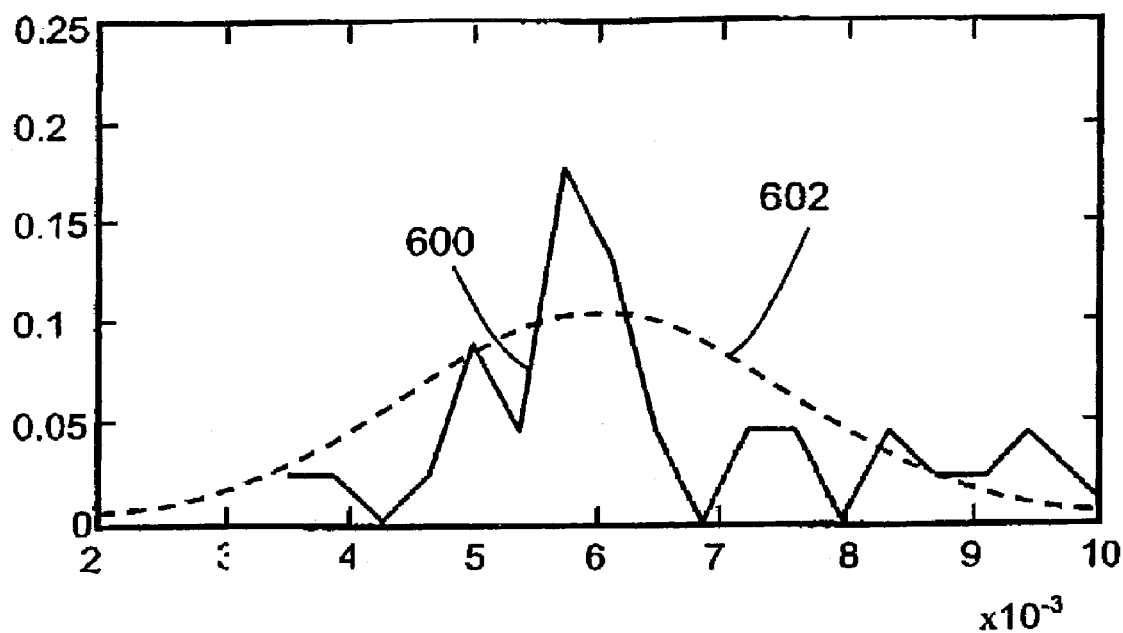
FIG. 6A illustrates a distribution of example frame features and the distribution of a Gaussian event model that best fits the set of frame features obtained from a segment of music.
Figure 6B:
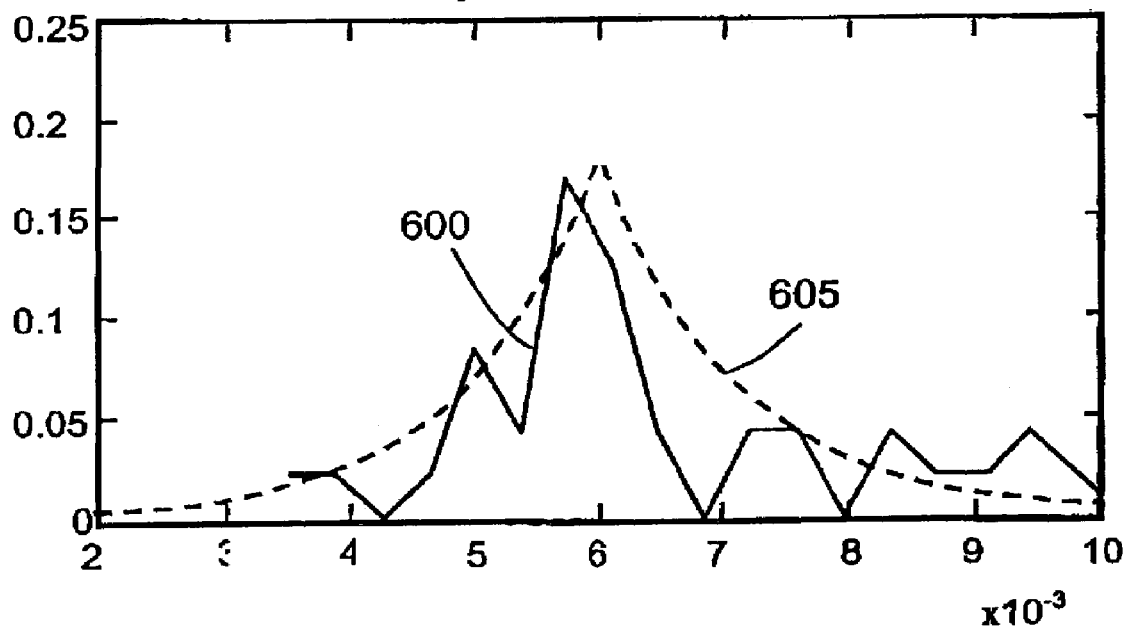
FIG. 6B illustrates a distribution of the example frame features of FIG. 6A and the distribution of a Laplacian event model that best fits the set of frame features.

This proposition is further illustrated in FIGS. 6A and 6B wherein a distribution 600 of segmentation frame features $f_s(i)$ obtained from an audio stream of duration 1 second containing music is shown. The distribution of a Gaussian event model 602 that best fits the set of segmentation frame features $f_s(i)$ is shown in FIG. 6A, and the distribution of a Laplacian event model 605 is illustrated in FIG. 6B.

A quantitative measure to substantiate that the Laplacian distribution provides a better description of the distribution characteristics of the segmentation frame features $f_s(i)$ for short events rather than the Gaussian model is the Kurtosis statistical measure $\kappa$, which provides a measure of the "peakiness" of a distribution and may be calculated for a sample set X as:

$$\kappa = \frac{E(X - E(X))^4}{(\text{var}(X))^2} - 3 \quad (8)$$

For a true Gaussian distribution, the Kurtosis measure $\kappa$ is 0, whilst for a true Laplacian distribution the Kurtosis measure $\kappa$ is 3. In the case of the distributions 500 and 600 shown in FIGS. 5A and 6A, the Kurtosis measures $\kappa$ are 2.33 and 2.29 respectively. Hence the distributions 500 and 600 are more Laplacian in nature than Gaussian.

The Laplacian probability density function in one dimension is:

$$g(f_s(i), \mu, \sigma) = \frac{1}{\sqrt{2}\,\sigma} \exp\left\{-\frac{\sqrt{2}\,|f_s(i) - \mu|}{\sigma}\right\} \quad (9)$$

where $\mu$ is the mean of the segmentation frame features $f_s(i)$ and $\sigma$ is their standard deviation. In a higher order feature space with segmentation frame features $f_s(i)$, each having dimension D, the feature distribution is represented as:

$$g\left(f_s(i), \mu, \sum\right) = \frac{2}{(2\pi)^{\frac{D}{2}} |\Sigma|^{\frac{1}{2}}} \quad (10)$$

$$\left\{\frac{(f_s(i) - \mu)^T \sum^{-1}(f_s(i) - \mu)}{2}\right\}^{\frac{v}{2}} K_v\left(\sqrt{2(f_s(i) - \mu)^T \Sigma^{-1}(f_s(i) - \mu)}\right)$$

where $v=(2-D)/2$ and $K_v(.)$ is the modified Bessel function of the third kind.

Whilst the method 200 can be used with multi-dimensional segmentation features $f_s(i)$, the rest of the analysis is contained to the one-dimensional space due to the use of the one-dimensional segmentation frame feature $f_s(i)$ shown in Equation (4).

Figure 7A:
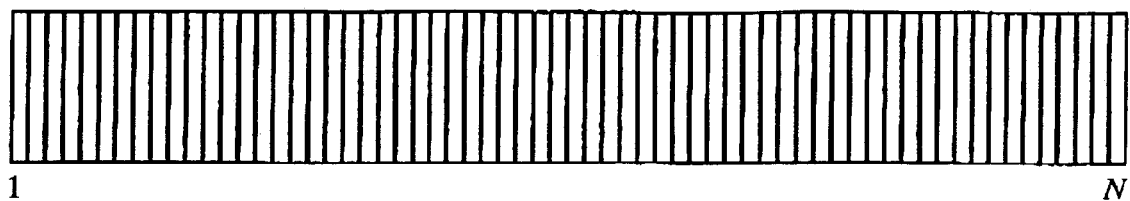
FIGS. 7A and 7B show a sequence of frames and the sequence of frames being divided at into two segments.

Given N segmentation frame features $f_s(i)$ as illustrated in FIG. 7A, the maximum likelihood L for the set of segmentation frame features $f_s(i)$ falling under a single Laplacian distribution is:

$$L = \prod_{i=1}^{N}\left((2\sigma^2)^{-\frac{1}{2}} \exp\left(-\frac{\sqrt{2}}{\sigma}\,|f_s(i) - \mu|\right)\right) \quad (11)$$

where $\sigma$ is the standard deviation of the segmentation frame features $f_s(i)$ and $\mu$ is the mean of the segmentation frame features $f_s(i)$. Equation (11) may be simplified in order to provide:

$$L = (2\sigma^2)^{\frac{N}{2}} \exp\left(-\frac{\sqrt{2}}{\sigma}\sum_{i=1}^{N}|f_s(i) - \mu|\right) \quad (12)$$

The maximum log-likelihood log(L), assuming natural logs, for all N frame features f(i) to fall under a single Laplacian event model is thus:

$$\log(L) = -\frac{N}{2}(2\sigma^2) - \frac{\sqrt{2}}{\sigma}\sum_{i=1}^{N}|f_s(i) - \mu| \quad (13)$$

Figure 7B:
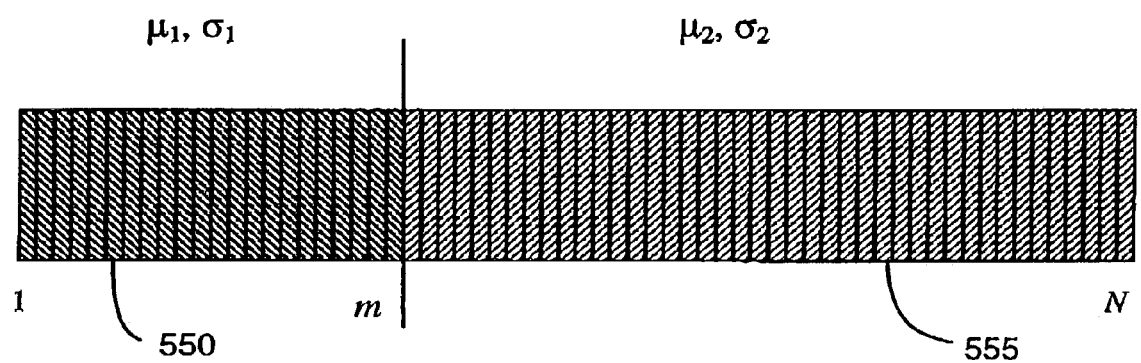

FIG. 7B shows the N frames being divided at frame m into two segments 550 and 555, with the first m number of frames [1, ..., m] forming segment 550 and the remainder of the N frames [m+1, ..., N] forming segment 555. A log-likelihood ratio R(m) that the segmentation frame features $f_s(i)$ belong to a twin-Laplacian distribution event model rather than a single Laplacian distribution event model, with the division at frame m and assuming segment 550 is from a first source and segment 555 is from a second source, is:

$$R(m) + \log(L_1) + \log(L_2) - \log(L) \quad (14)$$

where:

$$\log(L_1) = -\frac{m}{2}(2\sigma_1^2) - \frac{\sqrt{2}}{\sigma_1}\sum_{i=1}^{m}|f_s(i) - \mu_1| \quad (15)$$

and $$\log(L_2) = -\frac{(N-m)}{2}(2\sigma_2^2) - \frac{\sqrt{2}}{\sigma_2}\sum_{i=m+1}^{N}|f_s(i) - \mu_2| \quad (16)$$

wherein $\{\mu_1, \sigma_1\}$ and $\{\mu_2, \sigma_2\}$ are the means and standard deviations of the segmentation frame features $f_s(i)$ before and after the change point m.

The criterion difference $\Delta$BIC for the Laplacian case having a change point m is calculated as:

$$\Delta BIC(m) = R(m) - \frac{1}{2}\log\left(\frac{m(N-m)}{N}\right) \quad (17)$$

In a simplest of cases where only a single transition is to be detected in a section of audio represented by a sequence of N segmentation frame features $f_s(i)$, the most likely transition point $\hat{m}$ is given by:

$$\hat{m}=\arg(\max \Delta BIC(m)) \quad (18)$$

Figure 8A:
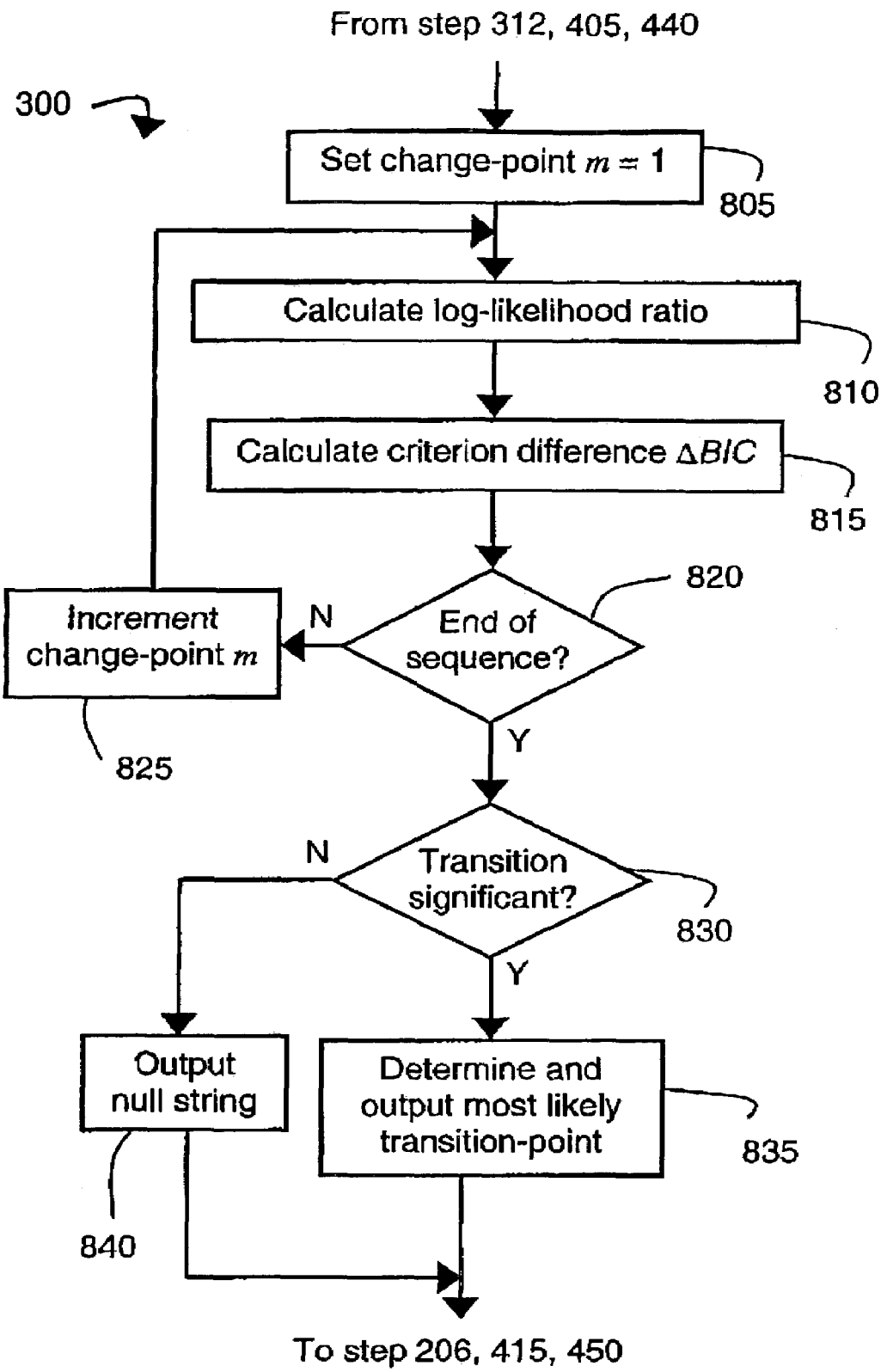
FIG. 8A shows a flow diagram of a method for detecting a single transition-point within a sequence of frame features.
Figure 8B:
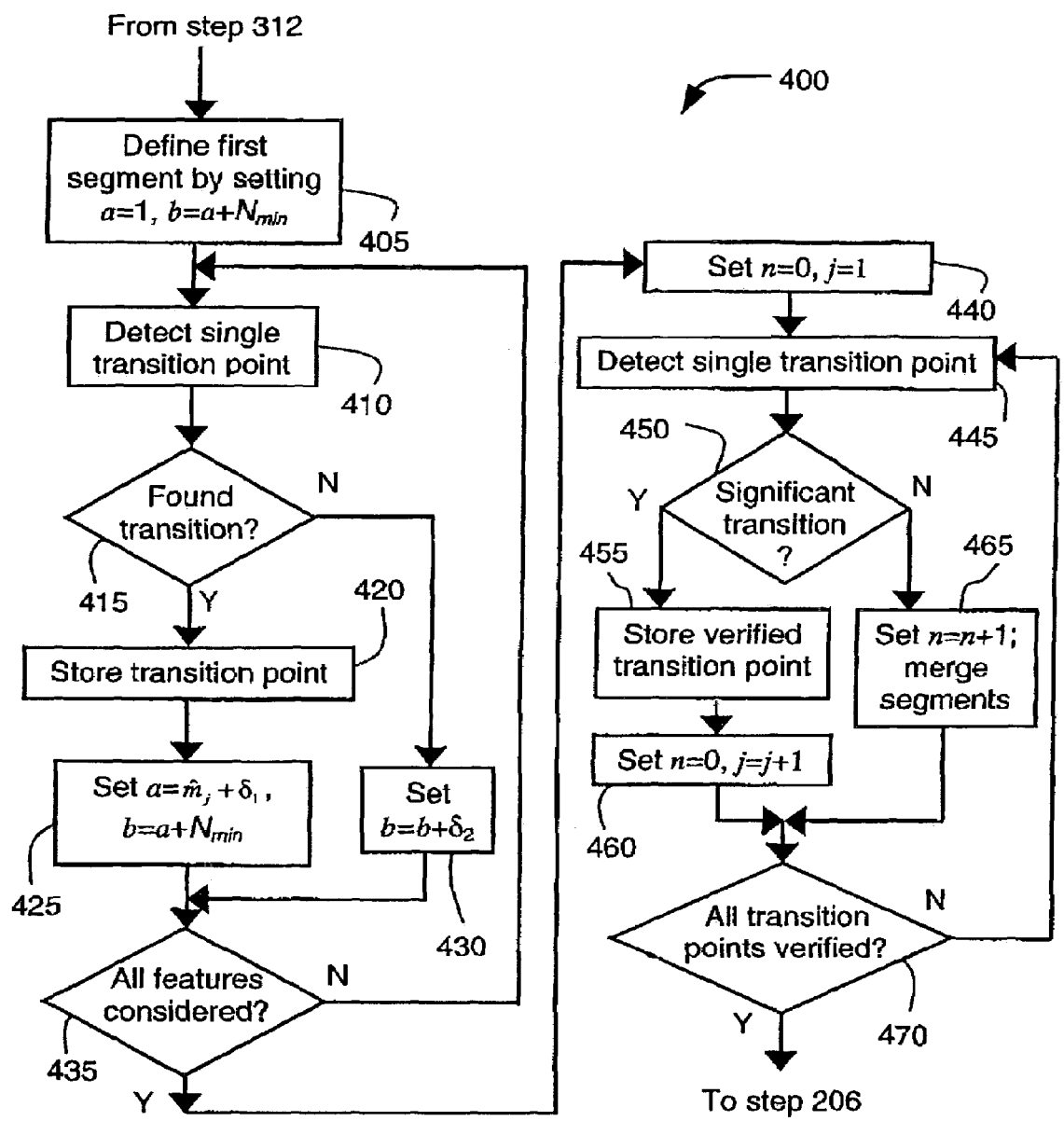
FIG. 8B shows a flow diagram of a method for detecting multiple transition-point within a sequence of frame features.

FIG. 8A shows a flow diagram of a method 300 for detecting a single transition-point $\hat{m}$ within a sequence of N segmentation frame features $f_s(i)$ that may be substituted as sub-step 314 in step 204 shown in FIG. 3. When more than one transition-point $\hat{m}_j$ is to be detected, the method 400 shown in FIG. 8B is substituted as sub-step 314 in step 204 (FIG. 3). Method 400 uses method 300 as is described below.

Method 300, performed by he processor 105, receives a sequence of N' segmentation frame features $f_s(i)$ as input. When method 300 is substituted as sub-step 314 in step 304, then the number of frames N' equals the number of features N. In step 805 the change-point m is set by the processor 105 to 1. The change-point m sets the point dividing the sequence of N' frame features f(i) into two separate sequences namely [1; m] and [m+1, N'].

Step 810 follows where the processor 105 calculates the log-likelihood ratio R(m) by first calculating the means and standard deviations $\{\mu_1,\sigma_1\}$ and $\{\mu_2,\sigma_2\}$ of the segmentation frame features $f_s(i)$ before and after the change-point m. Equations (13), (15) and (16) are then calculated by the processor 105, and the results are substituted into Equation (14). The criterion difference $\Delta BIC(m)$ for the Laplacian case having the change-point m is then calculated by the processor 105 using Equation (17) in step 815.

In step 820 the processor 105 determines whether the change point m has reached the end of the sequence of length N'. If the change-point m has not reached the end of the sequence, then the change-point m is incremented by the processor 105 in step 825, and steps 810 and 820 are repeated for the next change-point m. When the processor 105 determines the step 820 that the change-point m has reached the end of the sequence, then the method 300 proceeds to step 830 where the processor 105 determines whether a significant change in the sequence of N' segmentation frame features $f_s(i)$ occurred by determining whether the maximum criterion difference $\max[\Delta BIC(m)]$ has a value that is greater than a predetermined threshold. In the example, the predetermined threshold is set to 0. If the change was determined by the processor 105 in step 830 to be significant, then the method 300 proceeds to step 835 where the most likely transition-point $\hat{m}$ is determined using Equation (18), and the result is provided as output of method 300. Alternatively, if the change was determined in step 830 not to be significant, then the method 300 proceeds to step 840 where the null string is provided as output.

FIG. 8B shows a flow diagram of the method 400 for detecting multiple transition-points $\hat{m}_j$ within the sequence of N segmentation frame features $f_s(i)$ that may be used as sub-step 314 in step 204 shown in FIG. 3. Method 400 thus receives the sequence of N segmentation frame features $f_s(i)$ from sub-step 312 (FIG. 3). Given an audio stream that is assumed to contain an unknown number of transition-points $\hat{m}_j$, the method 400 operates principally by analysing short sequences of segmentation frame features $f_s(i)$, with each sequence consisting of $N_{min}$ segmentation frame features $f_s(i)$, and detecting a single transition-point $\hat{m}_j$ within each sequence, if it occurs, using method 300 (FIG. 8A). Once all the transition-points $\hat{m}_j$ have been detected, the method 400 performs a second pass wherein each of the transition-points $\hat{m}_j$ detected are verified as being significant by analysing the sequence of segmentation frame features $f_s(i)$ included in the segments either side of the transition-points $\hat{m}_j$ under consideration, and eliminating any transition-points $\hat{m}_j$ verified not to be significant. The verified significant transition-points $\hat{m}_j^l$ are then provided as output.

Method 400 starts in step 405 where the sequence of segmentation frame features $f_s(i)$ are defined by the processor 105 as being the sequence $[f_s(a);f_s(b)]$. The first sequence includes $N_{min}$ features and method 400 is therefore initiated with a=1 and b=a+$N_{min}$. The number of features $N_{min}$ is variable and is determined for each application. By varying $N_{min}$, the user can control whether short or spurious events should be detected or ignored, where the requirement being different with each scenario. In the example, a minimum segment length of 1 second is assumed. Given that the segmentation frame features $f_s(i)$ are extracted very 10 ms, being the window shift time, the number of features $N_{min}$ is set to 100.

Step 410 follows where the processor 105 detects a single transition-point $\hat{m}_j$ within the sequence $[f_s(a);f_s(b)]$, if it occurs, using method 300 (FIG. 8A) with N'=b−a. In step 415 the processor 105 determines whether the output received from step 410, i.e. method 300, is a transition-point $\hat{m}_j$ or a null string indicating that no transition-point $\hat{m}_j$ occurred in the sequence $[f_s(a);f_s(b)]$. If a transition-point $\hat{m}_j$ was detected in the sequence $[f_s(a);f_s(b)]$, then the method 400 proceeds to step 420 where that transition-point $\hat{m}_j$ is stored in the memory 106. Step 425 follows where a next sequence $[f_s(a);f_s(b)]$ is defined by the processor 105 by setting a=$\hat{m}_j$+$\delta_1$ and b=a+$N_{min}$, where $\delta_1$ is a predetermined small number of frames.

If the processor 105 determines in step 415 that no significant transition-point $\hat{m}_j$ was detected in the sequence $[f_s(a);f_s(b)]$, then the sequence $[f_s(a);f_s(b)]$ is lengthened by the processor 105 in step 430 by appending a small number $\delta_2$ of segmentation frame features $f_s(i)$ to the sequence $[f_s(a);f_s(b)]$ by defining b=b+$\delta_2$. From either step 425 or step 430 the method 400 proceeds to step 435 where the processor 105 determines whether all N segmentation frame features $f_s(i)$ have been considered. If all N segmentation frame features $f_s(i)$ have not been considered, then control is passed by the processor 105 to step 410 from where steps 410 to 435 are repeated until all the segmentation frame features $f_s(i)$ have been considered.

The method 400 then proceeds to step 440, which is the start of the second pass. In the second pass the method 400 verifies each of the $N_t$ transition-point $\hat{m}_j$ detected in steps 405 to 435. A transition-point $\hat{m}_j$ is verified by analysing the sequence of segmentation frame features $f_s(i)$ included in the segments either side of the transition-point $\hat{m}_j$ under consideration. Hence, when considering the transition-point $\hat{m}_j$, the sequence $[f_s(\hat{m}_{j-1}+1);f_s(\hat{m}_{j+1+n})]$ is analysed, with counter n initially being 0 and the verified transition-point $\hat{m}'_0$ also being 0.

Step 440 starts by setting counters j to 1 and n to 0. Step 445 follows where the processor 105 detects a single transition-point $\hat{m}$ within the sequence $[f_s(\hat{m}'_{j-1}+1);f_s(\hat{m}_{j+1+n})]$, if it occurs, using again method 300 (FIG. 8A). In step 450 the processor 105 determines whether the output received from step 445, i.e. method 300, is a transition-point $\hat{m}$ or a null string indicating that no significant transition-point $\hat{m}$ occurred in the sequence $[f_s(\hat{m}'_{j-1}+1);f_s(\hat{m}_{j+1+n})]$. If a transition-point $\hat{m}$ was detected in the sequence $[f_s(\hat{m}'_{j-1}+1);f_s(\hat{m}_{j+1+n})]$, then the method 400 proceeds to step 455 where that transition-point $\hat{m}$ is stored in memory 106 and in a sequence of verified transition-points $\{\hat{m}'\}$. Step 460 follows where the counter j is incremented and n is reset to 0.

Alternatively if the processor 105 in step 450 determined that no significant transition-point $\hat{m}$ was detected by step

445, then the sequence $[f_s(\hat{m}'_{j-1}+1);f_s(\hat{m}_{j+1+n})]$ is merged as a single segment, and the counter n is also incremented thereby extending the sequence of segmentation frame features $f_s(i)$ under consideration to the next transition-point $\hat{m}_j$.

From either step 460 or 465 the method 400 proceeds to step 470 where it is determined by the processor 105 whether all the transition-points $\hat{m}_j$ have been considered for verification. If any transition-points $\hat{m}_j$ remain, control is returned to step 445 from where steps 445 to 470 are repeated until all the transition-points $\hat{m}_j$ have been considered. The method 400 provides the sequence of verified transition-points $\{\hat{m}'\}$ as output. Referring again to FIG. 3, sub-step 314, and thus also step 204, provides as output homogeneous segments defined by the sequence of verified transition-points $\{\hat{m}'\}$.

Referring again to FIG. 2, from step 204 the method 200 proceeds to label the identity of an object contained within a particular homogeneous segment. To classify each of the homogeneous segments, a number of statistical features are extracted from each segment. Whilst previous systems extract from each segment a feature vector, and then classify the segments based on the distribution of the feature vectors, method 200 divides each homogenous segment into a number of smaller sub-segments, or clips hereinafter, with each clip large enough to extract a meaningful feature vector f from the clip. The clip feature vectors f are then used to classify the segment from which it is extracted based on the characteristics of the distribution of the clip feature vectors f. The key advantage of extracting a number of feature vectors f from a series of smaller clips rather than a single feature vector for a whole segment is that the characteristics of the distribution of the feature vectors f over the segment of interest may be examined. Thus, whilst the signal characteristics over the length of the segment are expected to be reasonably consistent, by virtue of the segmentation algorithm, some important characteristics in the distribution of the feature vectors f over the segment of interest is significant for classification purposes.

Step 206 divides each homogenous segment into a number of clips, with each clip comprising B frames. The number B of frames included in each clip is predefined, except the last clip of each segment which extends beyond the predefined length to the end of the segment. In the example where each frame is 20 ms long and overlapping with a shift-time of 10 ms, each clip is defined to be at least 0.8 seconds long. The clip thus comprises at least 80 frames.

Step 208 follows where the processor 105 extracts for each clip a feature vector f. In the preferred implementation, the feature vector f for each clip consists of seven different clip features, which are:

(i) Volume standard deviation;
(ii) Volume dynamic range;
(iii) Volume undulation;
(iv) 4 Hz volume peak;
(v) Zero-crossing rate STD;
(vi) Bandwidth; and
(vii) Pitch STD.

The extraction of each clip feature is not described in more detail.

(i) Volume standard deviation

The volume standard deviation (VSTD) is a measure of the variation characteristics of the RMS energy contour of the signal within the clip. The VSTD is calculated over the B frames of the clip as:

$$VSTD = \sqrt{\frac{\sum_{i=1}^{B} (E(i) - \mu_E)^2}{B}} \quad (19)$$

wherein E(i) is the energy of the modified set of windowed audio samples s(i,k) of the i'th frame calculated in sub-step 310 (FIG. 3) using Equation (3) and $\mu_E$ is the mean of the B frame energies E(i).

(ii) Volume dynamic range

The volume dynamic range (VDR) is similar to the VSTD, however it measures the range of deviation of the energy values E(i) only, and as such is calculated as:

$$VDR = \frac{\max_i(E(i)) - \min_i(E(i))}{\max_i(E(i))}, \text{ where } i \in [1, 2, \ldots, B] \quad (20)$$

(iii) Volume undulation

The volume undulation (VU) clip feature is once again based on the frame energies E(i) and accumulates the difference of neighboring peaks and valleys in the frame energies E(i) as:

$$VU = \sum_i |E_{peak}(i) - E_{valley}(i)| \quad (21)$$

Figure 13:
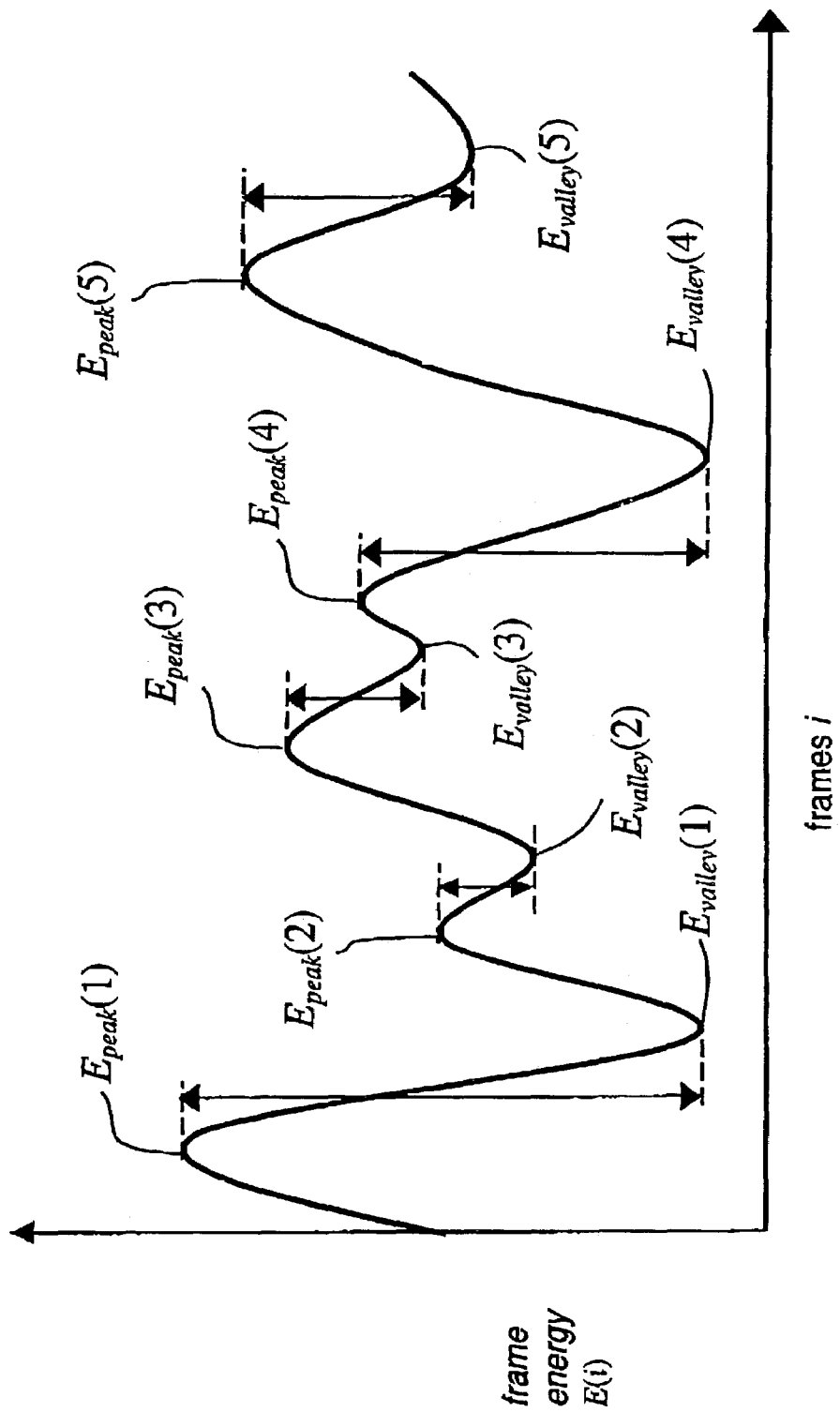
FIG. 13 illustrates the frame energies E(i) within a clip, and the extraction of a volume undulation clip feature.

FIG. 13 illustrates the frame energies E(i) within a clip as a continuous line. Within the clip the frame energy line has a number of peaks marked as $E_{peak}(1)$ to $E_{peak}(5)$ respectively. Each energy peak $E_{peak}(i)$ has a corresponding valley $E_{valley}(i)$ located between the energy peak $E_{peak}(i)$ and a following energy peak $E_{peak}(i+1)$, which are marked $E_{valley}(1)$ to $E_{valley}(5)$ respectively. In the example, the VU clip feature is the sum of the 5 differences between energy peak $E_{peak}(i)$ and energy valley $E_{valley}(i)$, with $i \in 1, \ldots, 5$.

(iv) 4 Hz Volume Contour Peak

The 4 Hz volume contour peak known as the 4 ME or FCVC4 clip is based on the observation that a signal containing predominantly speech will have a dominant peak in the frequency spectrum at around 4 Hz. Thus the FCVC4 clip feature is calculated as:

$$FCVC4 = \frac{\int_0^\infty W(\omega)|S(\omega)|^2 d\omega}{\int_0^\infty |S(\omega)|^2 d\omega} \quad (22)$$

where $|S(\omega)|^2$ is the power spectrum of the energy contour E(i) of the clip and $W(\omega)$ is a triangular window function centred at 4 Hz.

(v) Zero crossing rate standard deviation

The Zero crossing rate standard deviation (ZSTD) clip feature examines the standard deviation of the zero-crossing rate (ZCR) of the windowed audio samples s(i,k) within each frame i, over all frames in the clip of interest. The ZCR within a frame i represents the rate at which the windowed audio samples s(i,k) cross the expected value of the windowed audio samples s(i,k). When the windowed audio samples s(i,k) has a mean of zero, then the ZCR represents the rate at which the signal samples cross the zero signal line. Thus for frame i the ZCR(i) is calculated as:

$$ZCR(i) = \sum_{k=1}^{K} |\text{sign}(s(i,k) - \mu_s) - \text{sign}(s(i,k-1) - \mu_s)| \quad (23)$$

wherein $\mu_s$ is the mean of the K windowed audio samples s(i,k) within frame i. The ZSTD clip feature is then calculated over B frames as:

$$ZSTD = \sqrt{\frac{\sum_{i=1}^{B}(ZCR(i) - \mu_{ZCR})^2}{B-1}} \quad (24)$$

wherein $\mu_{ZCR}$ is the mean of the B ZCR values calculated using Equation (23).

(vi) Bandwidth

The dominant frequency range of the signal is estimated by the signal bandwidth. In order to calculate a long-term estimate of bandwidth BW over a clip, the frame bandwidths bw(i) (calculated using Equation (1)) are weighted by their respective frame energies E(i) (calculated using Equation (3)), and summed over the entire clip. Thus the clip bandwidth BW is calculated as:

$$BW = \frac{1}{\sum_{i=1}^{B} E(i)} \sum_{i=1}^{B} E(i)bw(i) \quad (25)$$

(vii) Pitch standard deviation

The pitch standard deviation (PSTD) attempts to measure the characteristics of the pitch variation over the clip of interest. Pitch is a measure of the fundamental frequency of a section of signal, hence a section of music or voiced speech will tend to have a smoother pitch contour than a section of silence or background noise.

In order to calculate the pitch contour, a supper resolution pitch detection (SRPD) algorithm is used, which known in the art. Given the frame pitch values p(i) for each frame i, the PSTD is then calculated as:

$$PSTD = \sqrt{\frac{\sum_{i=1}^{B}(p(i) - \mu_p)^2}{B-1}} \quad (26)$$

Figure 9:
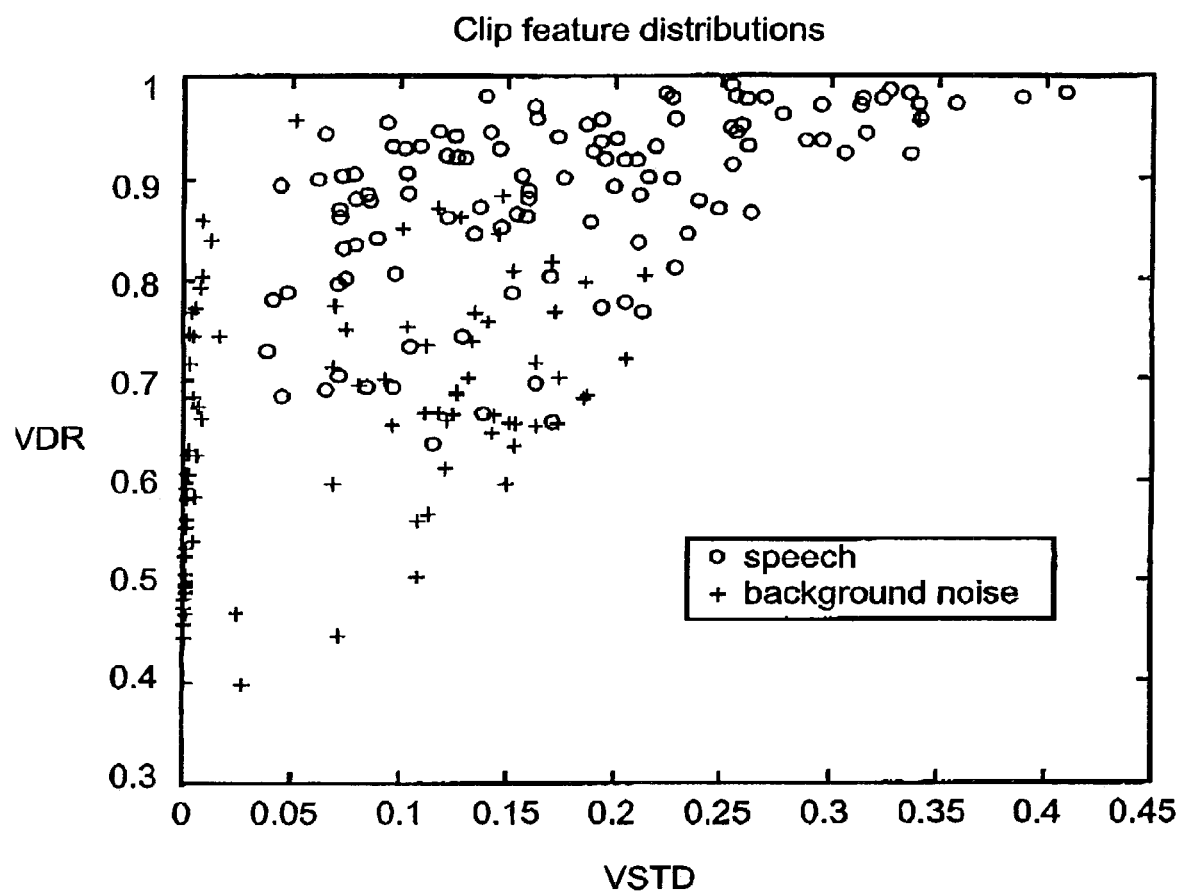
FIG. 9 shows a plot of the distribution of two particular clip features, namely the volume dynamic range (VDR) and volume standard deviation (VSTD), over a set of segments containing speech, and a set of segments containing background noise.

To illustrate the nature of the distribution of the clip features over a homogenous segment, FIG. 9 shows a plot of the distribution of two particular clip features, namely the volume dynamic range (VDR) and volume standard deviation (VSTD), over a set of segments containing speech, and a set of segments containing background noise. The distributions of each clip features, as shown in this example, are clearly multi-modal in nature.

With the clip features calculated, the clip feature vector f is formed by assigning each of the seven clip features as an element of the clip feature vector f as follows:

$$f = \begin{bmatrix} VSTD \\ VDR \\ VU \\ FCVC4 \\ ZSTD \\ BW \\ PSTD \end{bmatrix} \quad (26)$$

Referring again to FIG. 2, from step 208 method 200 continues to step 210 where the processor 105 classifies each segment based on the distribution of its clip feature vectors f. Because the segment is homogeneous, it relates to a single object and only one label type is attached to each segment.

The classification step 210 operates to solve what is known in pattern recognition literature as an open-set identification problem. The open-set identification may be considered as a combination between a standard closed-set identification scenario and a verification scenario. In a standard closed-set identification scenario, a set of test features from unknown origin are classified against features from a finite set of classes, with the most probable class being allocated as the identity label for the object associated with the set of test features. In a verification scenario, again a set of test features from an unknown origin are presented. However, after determining the most probable class, it is then determined whether the test features match the features of the class closely enough in order to verify its identity. If the match is not close enough, the identity is labelled as "unknown".

Accordingly, in an open-set identification problem, a finite number of classes are presented for classification against. An additional class is also used, labelled "unknown", and is assigned to test features that are deemed to not belong to any of the primary classes. The open-set identification problem is well suited to classification in an audio stream, as it is not possible to adequately model every type of event that may occur in an audio sample of unknown origin. It is therefore far better to label an event, which is dissimilar to any of the trained models, as "unknown", rather than falsely labelling it as another class.

Figure 10:
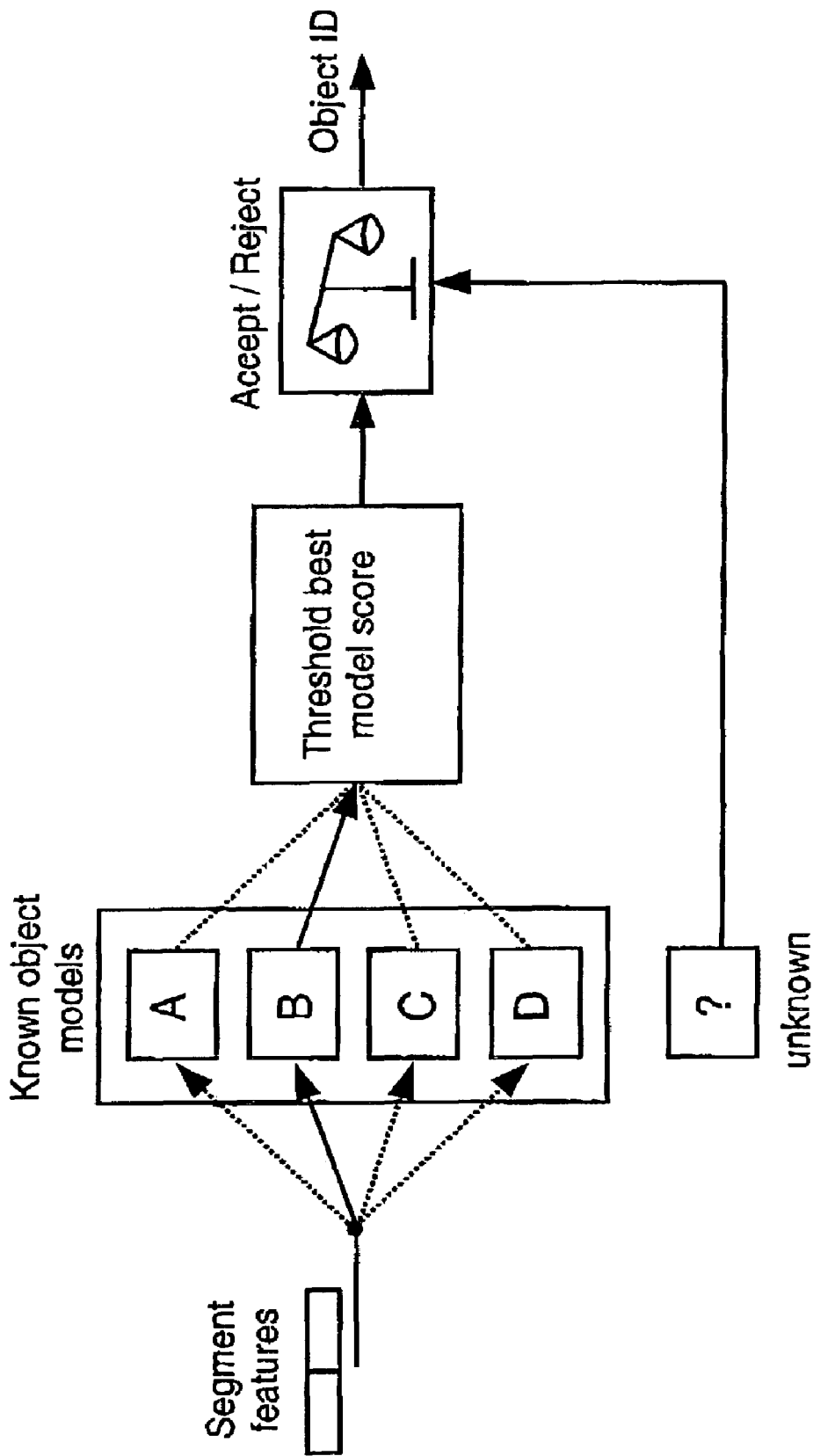
FIG. 10 illustrates the classification of the segment against 4 known classes A, B, C and D.

FIG. 10 illustrates the classification of the segment, characterised by its extracted feature vectors f, against 4 known classes A, B, C and D, with each class being defined by an object model. The extracted feature vectors f are "matched" against the object models by determining a model score between the feature vectors f of the segment and each of the object models. An empirically determined threshold is applied to the best model score. If the best model score is above the threshold, then the label of the class A, B, C or D to which the segment was more closely matched is assigned as the object label. However, if the best model score is below the threshold, then the segment does not match any of the object models closely enough, and the segment is assigned the label "unknown".

Given that the distribution of clip features is multi-modal, a simple distance measure, such as Euclidean or Mahalanobis, will not suffice for calculating a score for the classification. A classifier based on a continuous distribution function defining the distribution of the feature vectors f is used for the object classification. In the preferred implementation a mixture of Gaussians, or Gaussian Mixture Model (GMM) is used as the continuous distribution function. A Gaussian mixture density is defined as a weighted sum of M component densities, expressed as:

$$p(x|\lambda) = \sum_{i=1}^{M} p_i b_i(x) \quad (27)$$

where x is a D dimensional random sample vector, $b_i(x)$ are the component density functions, and $p_i$ are the mixture weights.

Each density function $b_i$ is a D dimensional Gaussian function of the form:

$$b_i(x) = \frac{1}{(2\pi)^{\frac{D}{2}}|\Sigma_i|^{\frac{1}{2}}} \exp\left\{-\frac{1}{2}(x-\mu_i)^T\Sigma_i^{-1}(x-\mu_i)\right\} \quad (28)$$

where $\Sigma_i$ is the covariance matrix and $\mu_i$ the mean vector for the density function $b_i$.

The Gaussian mixture model $\lambda_c$, with $c=1,2,\ldots,C$ where C is the number of class models, is then defined by the covariance matrix $\Sigma_i$ and mean vector $\mu_i$ for each density function $b_i$, and the mixture weights $p_i$, collectively expressed as:

$$\lambda_c = \{p_i, \mu_i, \Sigma_i\} i=1, \ldots, M \quad (29)$$

Figure 11:
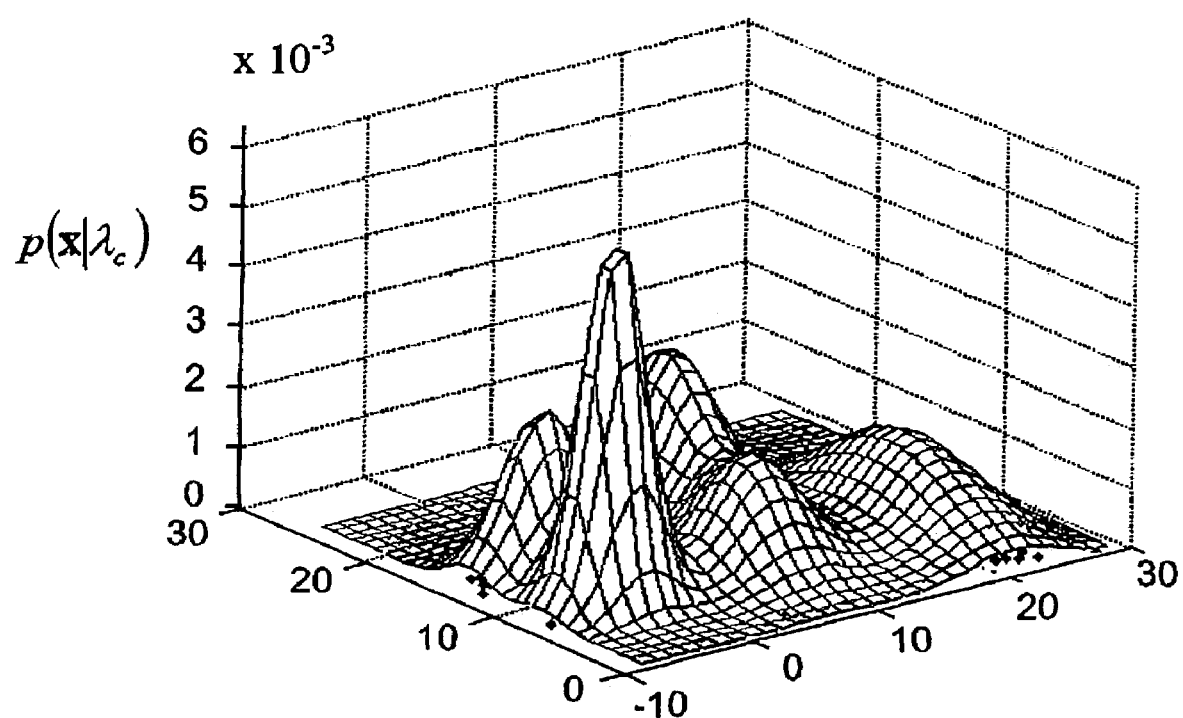
FIG. 11 is a diagram illustrating visually the nature of the Gaussian mixture model.

The characteristics of the probability distribution function $p(x|\lambda_c)$ of the GMM can be more clearly visualized when using two-dimensional sample data x. FIG. 11 shows an example five-mixture GMM for a sample of two-dimensional speech features $x_1$ and $x_2$, where $x=[x_1,x_2]$.

The GMM $\lambda_c$ is formed from a set of labelled training data via the expectation-maximization (EM) algorithm known in the art. The labelled training data is clip feature vectors f extracted from clips with known origin. The EM algorithm is an iterative algorithm that, after each pass, updates the estimates of the mean vector $\mu_i$, covariance matrix $\Sigma_i$ and mixture weights $p_i$. Around 20 iterations are usually satisfactory for convergence.

In a preferred implementation GMM's with 6 mixtures and diagonal covariance matrices $\Sigma_i$ are used. The preference for diagonal covariance matrices $\Sigma_i$ over full covariance matrices is based on the observation that GMM's with diagonal covariance matrices $\Sigma_i$ are more robust to mismatches between training and test data.

With the segment being classified comprising T clips, and hence being characterised by T clip feature vectors $f_t$, the model score between the clip feature vectors $f_t$ of the segment and one of the C object models is calculated by summing the log statistical likelihoods of each of T feature vectors $f_t$ as follows:

$$\hat{s}_c = \sum_{t=1}^{T} \log p(f_t | \lambda_c) \quad (30)$$

where the model likelihoods $p(f_t|\lambda_c)$ are determined by evaluating Equation (27). The log of the model likelihoods $p(f_t|\lambda_c)$ is taken to ensure no computational underflows occur due to very small likelihood values.

As described in relation to FIG. 10, an adaptive technique is used to determine whether or not the best model score $\hat{s}_p$ is good enough to attribute the label of the class resulting in the best model score $\hat{s}_p$ is assigned to the segment. The best model score $\hat{s}_p$ is defined as:

$$\hat{s}_p = \max_c (\hat{s}_c) \quad (31)$$

Figure 12:
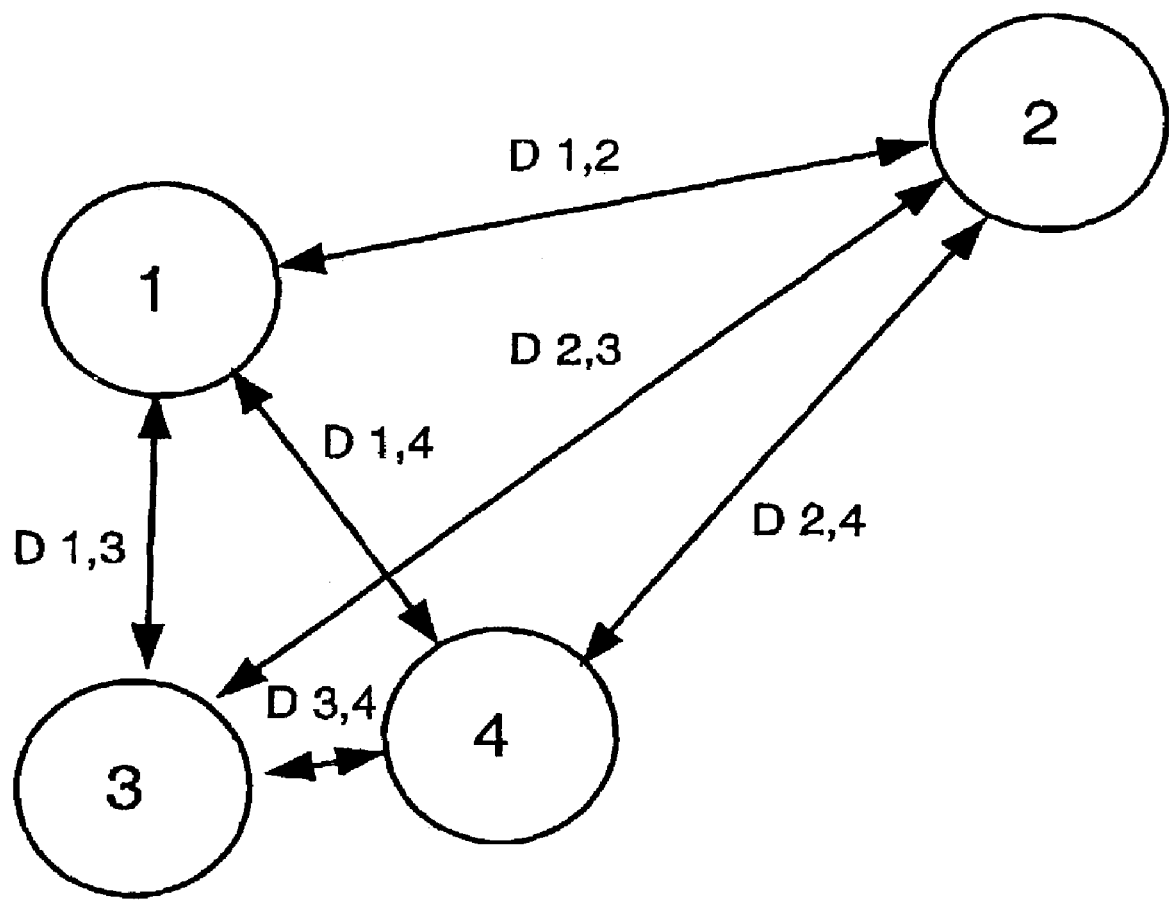
FIG. 12 is a diagram illustrating the inter-class distances for object models.

The adaptive technique is based upon a distance measure $D_{ij}$ between object models of the classes to which the test segment may belong. FIG. 12 illustrates four classes and the inter-class distances $D_{ij}$ between each object model i and j. As the object models are made up to a mixture of Gaussians, the distance measure $D_{ij}$ is based on a weighted sum of the Mahalanobis distance between the mixtures of the models i and j as follows:

$$D_{ij} = \sum_{m=1}^{M} \sum_{n=1}^{N} p_m^i p_n^j \Delta_{mn}^{ij} \quad (32)$$

where M and N are the number of mixtures in class models i and j respectively, $p_m^i$ and $p_n^j$ are the mixture weights within each model, and $\Delta_{mn}^{ij}$ is the Mahalanobis distance between mixture m of class i and mixture n of class j. The inter-class distances $D_{ij}$ may be predetermined from the set of labelled training data, and stored in memory 106.

The Mahalanobis distance between two mixtures is calculated as:

$$\Delta_{mn}^{ij} = (\mu_m^i - \mu_n^j)^T (\Sigma_m^i + \Sigma_n^j)^{-1} (\mu_m^i - \mu_n^j) \quad (33)$$

Because diagonal covariance matrices are used, the two covariance matrices $\Sigma_m^i$ and $\Sigma_n^j$ may simply be added in the manner shown. It is noted that the Mahalanobis distance $\Delta_{mn}^{ij}$ is not strictly speaking a correct measure of distance between two distributions. When the distributions are the same, the distance should be zero. However, this is not the case for the Mahalanobis distance $\Delta_{mn}^{ij}$ defined in Equation (33). For this to be achieved, various constraints have to be placed on Equation (32). This adds a huge amount of computation to the process and is not necessary for the classification, as a relative measures of class distances is all that is needed.

In order to decide whether the segment should be assigned the label of the class with the highest score, or labelled us "unknown", a confidence score is calculated. This is achieved by taking the difference of the top two model scores $\hat{s}_p$ and $\hat{s}_q$, and normalizing that difference by the distance measured $D_{pq}$ between their class models p and q. This is based on the premise that an easily identifiable segment should be a lot closer to the model it belongs to than the next closest model. With further apart models, the model scores $\hat{s}_c$ should also be well separated before the segment is assigned the class label of the class with the highest score. More formally, the confidence score may be defined as:

$$\Phi = 1000 \frac{\hat{s}_p - \hat{s}_q}{D_{pq}} \quad (34)$$

The additional constant of 1000 is used to bring the confidence score $\Phi$ into a more sensible range. A threshold $\tau$ is applied to the confidence score $\Phi$. In the preferred implementation a threshold $\tau$ of 5 is used. If the confidence score $\Phi$ is equal or above the threshold $\tau$, then the segment is given the class label of the highest model score $\hat{s}_p$, else the segment is given the label "unknown".

Referring again to FIG. 2, with each of the segments being assigned a label, the segment labels are provided as output in step 212, usually accompanied by the verified transition-points $\{\hat{m}'\}$ that define the boundaries of the segments. The output may be directly to the display 114. Typically method 200 would form part of another application in which the labels are used for further processing. A number of such applications are now described as examples only, with the applications being illustrative and not restrictive.

Applications (i) Offline metadata Generation

A key application in which the segmentation and classification method 200 may be used is in the automatic generation of object identity metadata from a large amount of offline audio data. In such an application method 200 processes the continuous stream of audio, and then generates and stores to a text-file the location information and identities of objects such as speech, music, a particular speaker, etc.

The object identity metadata may then be used in aiding subsequent fast retrieval of information form a large stream of data. For example, a user may which to locate where in the audio stream a particular speaker starts talking or where music starts, etc. In such a case, all segments with the object label of the event of interest may easily be retrieved by simply extracting all segments with a particular label.

(ii) Object Detection to aid Automatic Filming

Another application in which the segmentation and classification method 200 may be used is in a real-time automatic filming application for sensibly film a scene based on incoming metadata. Most of the metadata would be comprised from visual information. The segmentation and classification method 200 operates within a small buffer of audio obtained from an attached microphone to create additional metadata. The metadata from the audio is used as an additional input to control a camera (not illustrated). For example, if a new noise type is detected, the camera is controlled to pan out.

(iii) Automatic recording of video in unattended systems

Yet another application in which the segmentation and classification method 200 may be used is in the automatic recording of video in unattended systems. In unattended systems it is desirable to save storage space. This is achieved by only hard-recording events that could be of potential interest, which may be determined by the label assigned to audio segments. For example, a security system may only wish to record video when significant instances of sound activity or speech are detected.

In order for this to be implemented, given that the segmentation and classification method 200 is non-causal and must have access to data ahead in time of the point it is currently analysing, a memory buffer is used to hold audio data for a specified length of time, such as 30 seconds. The segmentation and classification method 200 then segments the audio data in the buffer in the normal manner, and classifies each segment by comparing the clip features f of the segment against known event models, such as speech or general noise models. Such an application can then determine whether these events have occurred within the audio in the buffer. If one or more of the segments is deemed to contain sound activity, then this and subsequent buffers of audio, with the respective video information, is written to the storage device 109. The writing to storage device 109 continues until either no more sound activity is detected in the current audio buffer or until a specified length of time has elapsed after the first sound event.

The foregoing describes only some embodiments of the present invention, and modifications and/or changes can be made thereto without departing from the scope and spirit of the invention, the embodiment(s) being illustrative and not restrictive.

The claims defining the invention are as follows:

1. A method of classifying a homogeneous audio segment into one of a plurality of classes, said method comprising the steps of:
   dividing said homogeneous audio segment into a plurality of sub-segments;
   extracting for each sub-segment a feature vector; and
   classifying said homogeneous audio segment by comparing said feature vectors of said plurality of sub-segments with a plurality of continuous distribution functions, wherein each continuous distribution function defines one of said plurality of classes.

2. The method as claimed in claim 1 wherein said feature vector includes at least one feature extracted from the group comprising:
   a bandwidth of a plurality of audio samples of said sub-segment; and
   an energy value of a plurality of audio samples of said sub-segment.

3. The method as claimed in claim 1 wherein said feature vector comprises at least two features selected from the group consisting of:
   Volume standard deviation;
   Vlume dynamic range;
   Volume undulation;
   4 Hz volume peak;
   Zero-crossing rate STD;
   Bandwidth; and
   Pitch STD.

4. The method as claimed in claim 1 wherein said classifying step comprises the sub-steps of:
   calculating a measure of similarity between said feature vectors of said plurality of sub-segments and each of said continuous distribution functions associated with said plurality of classes;
   determining the highest measure of similarity;
   determining a confidence measure for said highest measure of similarity;
   comparing said confidence measure with a confidence threshold; and
   classifying said homogeneous audio segment as belonging to the class associated with said highest measure of similarity, upon said confidence measure being greater than said confidence threshold.

5. The method as claimed in claim 4 wherein said classifying step comprises the further sub-step of:
   classifying said homogeneous audio segment as belonging to an unknown class upon said confidence measure being less than said confidence threshold.

6. The method as claimed in claim 4 wherein said confidence measure includes a measure of separation between said continuous distribution functions.

7. The method as claimed in claim 1 wherein said continuous distribution functions are Gaussian Mixture Models.

8. An apparatus for classifying a homogeneous audio segment into one of a plurality of classes, said apparatus comprising:
   means for dividing said homogeneous audio segment into a plurality of sub-segments;
   means for extracting for each sub-segment a feature vector; and
   means for classifying said homogeneous audio segment by comparing said feature vectors of said plurality of sub-segments with a plurality of continuous distribution functions, wherein each continuous distribution function defines one of said plurality of classes.

9. The apparatus as claimed in claim 8 wherein said feature vector includes at least one feature extracted from the group comprising:
   a bandwidth of a plurality of audio samples of said sub-segment; and
   an energy value of a plurality of audio samples of said sub-segment.

10. The apparatus as claimed in claim 8 wherein said feature vector comprises at least two features selected from the group consisting of:
Volume standard deviation;
Volume dynamic range;
Volume undulation;
4 Hz volume peak;
Zero-crossing rate STD;
Bandwidth; and
Pitch STD.

11. The apparatus as claimed in claim 8 wherein said means for classifying comprises:
means for calculating a measure of similarity between said feature vectors of said plurality of sub-segments and each of said continuous distribution functions associated with said plurality of classes;
means for determining the highest measure of similarity;
means for determining a confidence measure for said highest measure of similarity;
means for comparing said confidence measure with a confidence threshold; and
means for classifying said homogeneous audio segment as belonging to the class associated with said highest measure of similarity, upon said confidence measure being greater than said confidence threshold.

12. The apparatus as claimed in claim 11 wherein said means for classifying further comprises means for classifying said homogeneous audio segment as belonging to an unknown class upon said confidence measure being less than said confidence threshold.

13. The apparatus as claimed in claim 11 wherein said confidence measure includes a measure of separation between said continuous distribution functions.

14. A program stored in a memory medium for classifying a homogeneous audio segment into one of a plurality of classes, said program comprising;
code for dividing said homogeneous audio segment into a plurality of sub-segments;
code for extracting for each sub-segment a feature vector; and
code for classifying said homogeneous audio segment by comparing said feature vectors of said plurality of sub-segments with a plurality of continuous distribution functions, wherein each continuous distribution function defines one of said plurality of classes.

15. The program as claimed in claim 14 wherein said code for classifying comprises:
code for calculating a measure of similarity between said feature vectors of said plurality of sub-segments and each of said continuous distribution functions associated with said plurality of classes;
code for determining the highest measure of similarity;
code for determining a confidence measure for said highest measure of similarity;
code for comparing said confidence measure with a confidence threshold; and
code for classifying said homogeneous audio segment as belonging to the class associated with said highest measure of similarity, upon said confidence measure being greater than said confidence threshold.

16. The program as claimed in claim 15 wherein said code for classifying further comprises:
code for classifying said homogeneous audio segment as belonging to an unknown class upon said confidence measure being less than said confidence threshold.

* * * * *

UNITED STATES PATENT AND TRADEMARK OFFICE
CERTIFICATE OF CORRECTION

PATENT NO. : 7,263,485 B2
APPLICATION NO. : 10/446099
DATED : August 28, 2007
INVENTOR(S) : Wark It is certified that error appears in the above-identified patent and that said Letters Patent is hereby corrected as shown below:

COLUMN 3:
Line 5, "at" should be deleted.

COLUMN 12:
Line 53, "$\uparrow S(\omega)|^2$" should read -- $|S(\omega)|^2$ --.

COLUMN 13:
Line 37, "which" should read -- which is --.

COLUMN 17:
Line 8, "form" should read -- from --;
Line 9, "which" should read -- wish --; and
Line 17, "film" should read -- filming --.

COLUMN 18:
Line 17, "Vlume" should read -- Volume --.

Signed and Sealed this

Fourth Day of November, 2008

JON W. DUDAS
*Director of the United States Patent and Trademark Office*